United States Patent [19]

Kobayashi et al.

[11] Patent Number: 4,705,379

[45] **Date of Patent: * Nov. 10, 1987**

[54] AUTOMATIC PROCESSING MACHINE FOR PHOTOGRAPHY

[75] Inventors: Kazuhiro Kobayashi; Shigeharu Koboshi; Satoru Kuse; Kazuyoshi Miyaoka; Masayuki Kurematsu; Makoto Uchida, all of Hino, Japan

[73] Assignee: Konishiroku Photo Ind. Co., Ltd., Tokyo, Japan

[ * ] Notice: The portion of the term of this patent subsequent to Nov. 10, 2004 has been disclaimed.

[21] Appl. No.: 719,367

[22] Filed: Apr. 3, 1985

[30] Foreign Application Priority Data

Apr. 9, 1984 [JP] Japan .................................. 59-69158

[51] Int. Cl.⁴ ................................................ G03B 3/06

[52] U.S. Cl. .................................... 354/324; 354/328; 137/563

[58] Field of Search ............... 354/319, 320, 321, 322, 354/324, 328, 331; 137/563

[56] References Cited

U.S. PATENT DOCUMENTS

| | | | |
|---|---|---|---|
| 3,000,288 | 9/1961 | Winnek | 354/328 |
| 3,332,435 | 7/1967 | Anderson et al. | 137/563 |
| 3,623,416 | 11/1971 | Anderberg | 354/324 |
| 3,990,088 | 11/1976 | Takita | 354/324 |
| 4,035,818 | 7/1977 | King | 354/331 |
| 4,081,816 | 3/1978 | Geyken et al. | 354/324 |
| 4,215,719 | 8/1980 | Laar et al. | 137/563 |
| 4,362,377 | 12/1982 | Yoshida et al. | 354/328 |
| 4,518,240 | 5/1985 | Taylor et al. | 354/324 |

FOREIGN PATENT DOCUMENTS

| | | | |
|---|---|---|---|
| 943653 | 12/1963 | United Kingdom | 354/324 |

*Primary Examiner*—A. A. Mathews

*Attorney, Agent, or Firm*—Frishauf, Holtz, Goodman & Woodward

[57] ABSTRACT

An automatic processing machine for photography which performs developing processing of a photographic light-sensitive material automatically while replenishing a processing solution tank with a replenisher solution from a replenisher tank, wherein said replenisher tank comprises a means for circulating and stirring having a jetting section for jetting a processing solution in said replenisher tank to the vicinity of the solution surface in said replenisher tank.

The automatic processing machine according to the present invention is capable of mixing and dissolving rapidly even a processing solution containing a poorly soluble alcohol to prepare a processing solution, without any need of a special and separate dissolving tank.

19 Claims, 5 Drawing Figures

AUTOMATIC PROCESSING MACHINE FOR PHOTOGRAPHY

BACKGROUND OF THE INVENTION

This invention relates to an automatic processing machine for processing of photographic light-sensitive materials.

More particularly, the present invention pertains to an automatic processing machine which performs developing processing of photographic light-sensitive materials automatically, while replenishing a replenisher processing solution to a starting processing solution filled in a processing tank.

For processing of photographic light-sensitive materials by means of an automatic processing machine while replenishing a replenisher processing solution (hereinafter referred to merely as replenisher solution), two kinds of processing solutions of a starting processing solution (hereinafter referred to merely as starting solution) and a replenisher solution are generally employed. When processing is started for the first time by means of an automatic processing machine which has been carried in and installed or when the processing solution in the processing tank has been discarded for some reason, the processing tank is first filled with a starting solution, then a predetermined amount of a replenisher solution corresponding to the amount of the light-sensitive materials processed is replenished, and a part of the fatigued processing solution in the processing tank is discharged out from the overflow discharging outlet.

The starting solution and the replenisher solution are generally prepared by use of tanks for preparation of processing solutions called as mixing tanks etc. by dissolving or diluting a kit of processing agents with water. However, use of tanks for preparation of processing solutions requires a space for its installment or a working space for performing dissolving working, thus bringing about inconveniences in working in a narrow place such as a small scale photofinishing laboratory for color photography. For the purpose of obviating such tanks for preparation of processing solutions which dissolve or dilute replenisher solutions, there has been proposed, for example, with respect to the replenisher solution, the so-called automatic replenishing device, in which the replenisher solution is prepared in a replenisher tank for storing the replenisher solution or the processing agent kit and water from a water supplying tank in amounts necessary for replenishing once or several times are metered and mixed before replenishing. However, according to the latter technique, the device employed will become too large to be suitable for an automatic processing machine to be used for a small scale photofinishing laboratory of photography with a small amount of processings. Accordingly, the present inventors, concerning the former technique, have proposed a replenisher tank which has enabled preparation of a replenisher solution by providing a circulating and stirring means for circulating a processing solution. The previously proposed technique is a replenisher tank in an automatic processing machine which can prepare not only the replenisher solution but also the starting solution.

The present inventors have continued the study about the previously proposed technique and consequently found that some troubles will occur in dissolving and mixing some kinds of processing solutions, for example, a processing solution for light-sensitive silver halide color photographic material containing a poorly soluble alcohol.

To describe in detail, it is well known in the art to incorporate a poorly soluble alcohol in a color developing solution containing an aromatic primary amine type color developing agent. This kind of alcohol is employed for promoting the reaction between the color developing agent and a coupler for image formation, namely for enhancing the coupling effect. For example, as disclosed in U.S. Pat. Nos. 2,304,925 and 3,814,606, benzyl alcohol is particularly effective for this purpose.

Such a poorly soluble alcohol, for example, benzyl alcohol is very poor in solubility in water, and therefore thorough stirring and/or heating is required for complete dissolution thereof. Further, if benzyl alcohol is dissolved insufficiently, "tar" is formed on the surface or the bottom of the solution.

One method to dissolve completely the color developing solution containing such a poorly soluble alcohol is to circulate and mix the solution by means of a pump of a large capacity. However, even by use of such a large capacity pump, it will take a long time for circulating mixing and use of a large capacity pump for circulating mixing will require a superfluous space necessary for the large capacity pump, particularly in the case of a built-in type replenishing tank in an automatic processing machine, which is not desirable for an automatic processing machine for a small scale photofinishing laboratory in which the installment space is very limited.

Accordingly, it is required to develop a technique which can rapidly dissolve even a processing solution for light-sensitive silver halide color photographic material containing a poorly soluble alcohol.

SUMMARY OF THE INVENTION

This invention has been accomplished with the background of the state of the art as described above, and an object of this invention is to provide an automatic processing machine for photography, which is capable of mixing and dissolving rapidly even a processing solution for light-sensitive silver halide color photographic material containing a poorly soluble alcohol to prepare a processing solution, without any need of a special and separate dissolving tank.

Such an object of the present invention can be accomplished by an automatic processing machine for photography which performs developing processing of a photographic light-sensitive material automatically while replenishing a processing solution tank with a replenisher solution from a replenisher tank, wherein said replenisher tank comprises a means for circulating and stirring having a jetting section for jetting a processing solution in said replenisher tank to the vicinity of the solution surface in said replenisher tank.

BREIF DESCRIPTION OF THE DRAWINGS

FIG. 1 through FIG. 4 show preferred embodiments of the replenisher tank used in the processing machine according to the present invention, respectively, each being a sectional view of the pertinent portion illustrating the relationship between the replenisher tank and the processing tank; and FIG. 5 is a schematic plan view of one example of an automatic processing machinė according to the present invention can preferably be applied.

DESCRIPTION OF PREFERRED EMBODIMENTS

Figure 1:
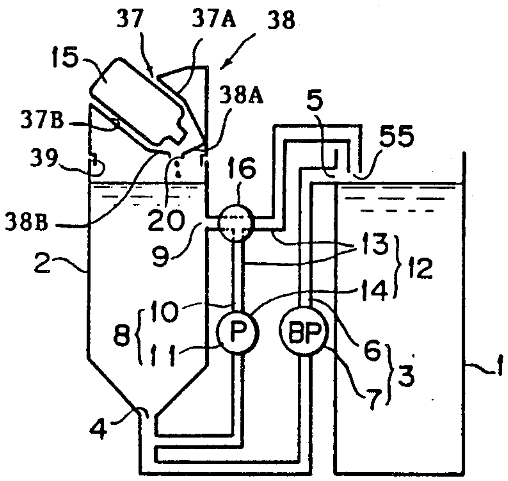

According to a preferred embodiment of the present invention, similarly as in the technique previously proposed, the replenisher tank is built in the automatic developing machine, and developing processing of a photographic material is performed while the replenisher solution is prepared in said built-in type replenisher tank and said replenisher solution prepared is replenished to the processing tank. Further, according to another preferred embodiment of the present invention, the replenisher tank is constructured so that not only the replenisher solution but also the starting solution can be prepared in the replenisher tank. And, the present invention is preferably applied particularly for preparation of color developing replenisher solution and/or starting solution for color paper.

The present invention is described below more in detail by referring to preferred embodiments, however, to which the embodiment of the present invention is not limited at all.

FIG. 1 through FIG. 4 show preferred embodiments of the present invention, respectively, each being a sectional view of the pertinent portion illustrating the relationship between the replenisher tank and the processing tank.

In each Figure, 1 is a processing tank, which performs one of the developing processing steps by passing a photographic light-sensitive material through said tank by means of a conveying means such as conveying rack etc. 2 is a replenisher tank which replenishes the replenisher solution to said processing tank 1. 3 is a means for delivering replenisher solution which delivers and replenishes quantitatively the replenisher solution in said replenisher tank 2 to said processing tank 1, and is constructed of a passage 6 communicated to the bottom opening 4 of the replenisher tank 2 and the upper opening 5 of the processing tank 1 and a constant delivery pump 7 such as Bellows Pump etc. provided in said passage 6. 8 is a means for circulating and stirring the processing solution, which stirs and mixes the processing solution in the replenisher tank 2 by circulation, and constructed of a passage 10 communicated to the bottom opening 4 and the upper opening 9 (preferably below the liquid surface) of the replenisher tank 2 and a liquid delivering pump 11 provided in said passage 10. 12 is a means for delivering the starting solution prepared in the replenisher tank 2 and constructed of a passage 13 communicated to the bottom opening 4 of the replenisher tank 2 and the upper opening 55 of the processing tank 1 and a liquid delivering pump 14 provided in said passage 13. In the Figures, 15 shows a kit of processing agents (comprising one or two or more kinds of solution or powder), and 16 shows a three-way valve for change-over.

Figure 2:
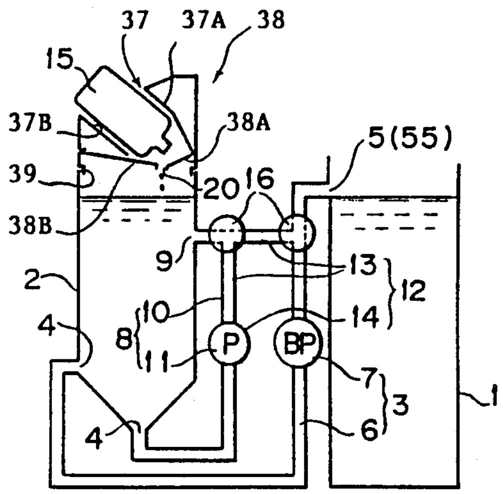

As shown in FIGS. 1 and 2, the upper opening 39 of the replenisher tank 2 is covered with a member 38 having a vessel holding mouth 37 capable of holding obliquely a vessel 15 of developing agent kit. The inclined portion 38A of said member 38 on the front side of the pouring inlet 20 and the inclined portion 38B on the rear side of the pouring inlet 20 are inclined as seen in FIGS. 1 and 2. As seen in FIGS. 1 and 2, the vessel holding mouth 37 has a diameter slightly greater than the largest outer diameter portions of the liquid agent vessels 15 to be used. The mouth 37 has an inclined portion 37A on the upper side in cross-section and an inclined portion 37B on the lower side in cross-section. The developing agent kit vessels 15 can be loaded into the mouth 37 for pouring into the replenisher tank 2 as seen in FIGS. 1 and 2.

The member 38 may be made integral with the vessel holding mouth 37 (see FIG. 1). Also, the member 38 including the mouth 37 is preferably detachably mounted relative to the upper opening 39 as shown in FIGS. 1 and 2. The covering portion (engaging portion) of the member 38 corresponding to the upper opening 39 is on the inner side of the tank as shown in FIGS. 1 and 2.

Figure 3:
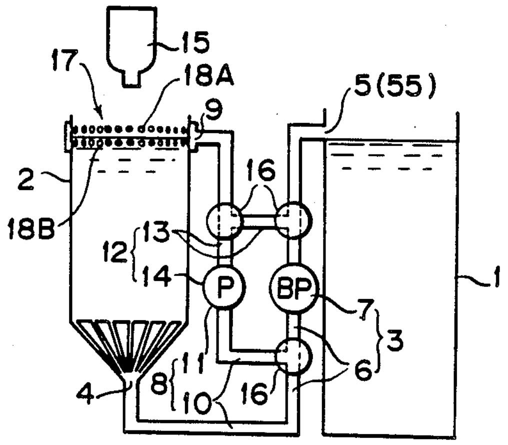
Figure 4:
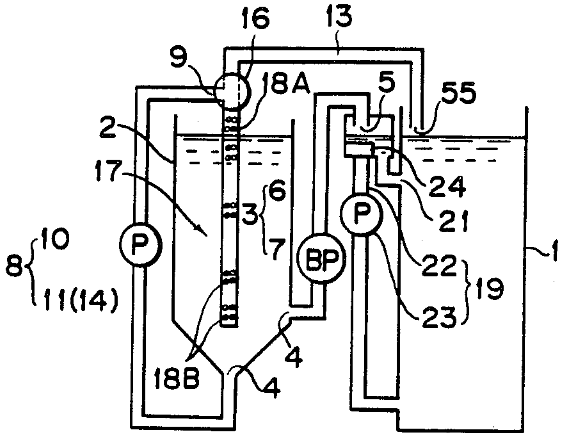

In the embodiments of FIGS. 3 and 4, there is provided a jetting section 17 which jets the processing solution to the vicinity of the liquid surface of the replenisher tank 2. Said jetting section 17 may be constructed, as shown in FIG. 4, of a pipe having jetting orifices 18A and 18B at the portions both above and below the liquid surface, which is arranged approximately at the central portion in the replenisher tank 2, or, as shown in FIG. 3, of a jacket having jetting orifices 18A and 18B on the outer walls arranged at the liquid surface portion of the replenisher tank 2. And shown in FIG. 4, the pipe has jetting orifices 18A located above the liquid surface of the replenisher tank 2 and also submerged jetting orifices 18B extending immediately below the liquid surface to the bottom, the pipe being arranged at approximately the central portion of the replenisher tank 2. In such constructions, the jetting orifices on the pipe in the vicinity of the liquid surface 18A and in the vicinity of the bottom 18B should preferably have more dense opening ratios than other portions. The pipe may be either closed or opened at its tip end portion. Further, a combination of two or more of these constructions may also be used.

In FIG. 4, 19 is a means for circulating and stirring the processing solution in the processing tank 1, and constructed of a passage 22 communicated to the bottom opening 20 and the upper opening 21 (preferably below the liquid surface) of said processing tank 1 and a liquid delivering pump 23 provided in said passage, a filter for liquid cleaning 24 being arranged at the upper part of said passage 22.

The actions of the above respective embodiments are described as follows. A predetermined amount of a starting solution is prepared by stirring and mixing a predetermined amount of water introduced from the water supply tank (see FIG. 5) and a predetermined amount of processing agents from the processing agent kit 15 by permitting them to circulate through the passage 10 by actuation of the liquid delivering pump 11. Next, the liquid delivering pump 14 is actuated to deliver said starting solution in the replenisher tank 2 through the passage 13 to the processing tank 1 to fill the processing tank 1 with said starting solution. Subsequently, a predetermined amount of replenisher solution is prepared by stirring and mixing a predetermined amount of water introduced from the water supply tank etc., and a predetermined amount of processing agents from other processing agent kit 15 by permitting them to circulate through the passage 10 by actuation of the liquid delivering pump 11. Said replenisher solution is replenished quantitatively intermittently (or continuously) through the actuation of the constant delivery pump 7 through the passage 6 into the processing tank 1 during running processing of a light-sensitive material in the processing tank 1. Of course, the three-way valve 16 for change-over is changed over for changing the passage to be used. Also, in replenishing the above replenisher solution to the processing tank 1, it may be replenished so that the processing solution in said processing tank 1 may be overflowed from the overflow discharge outlet (not shown).

The jetting section 17 in the present invention acts as follows in preparation of the above starting solution and/or the replenisher solution. That is to say, by permitting the processing solution to be jetted out through the jetting orifices 18A and/or 18B, a poorly soluble alcohol can be subjected to stirring and mixing in the vicinity of the liquid surface, whereby it can be dissolved within a short time even by use of the pump 11 of a relatively small capacity to prepare a solution.

In the present invention, it is preferred to employ a construction which can prevent a poorly soluble alcohol from remaining on the bottom of the replenisher tank 2. For this purpose, there may be practiced a contrivance, for example, to make the bottom of the tank 2 bevelled toward the bottom opening 4 (see FIG. 1, FIG. 2 and FIG. 4) or to provide a number of bottom openings by excavation so as to enable drawing out of a poorly soluble alcohol, etc. from any portion of the bottom surface (see FIG. 3).

Automatic processing machines for photography, in the case when the photographic light-sensitive material to be processed is for color photography, generally have two or more processing tanks and replenisher tanks for carrying out the processes automatically, for example, color developing, bleach-fixing (or bleaching and fixing), stabilizing, waterless rinsing, etc. In this case, practicing of the tank construction according to the present invention in at least one replenisher solution tank will evidently belong to the technical scope of the present invention.

Figure 5:
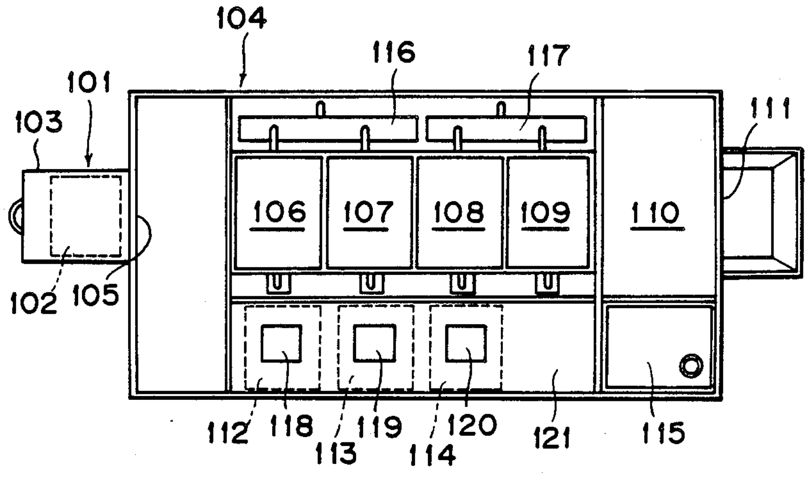

The automatic processing machine for photography to be preferably used for application of the present invention comprises a built-in type replenisher tank (including a detachable one). FIG. 5 illustrates an embodiment of the processing machine of the present invention in which a processing tank, a replenisher tank, etc. explained in FIGS. 1 to 4 are incorporated. In FIG. 5, the printing paper 102 in the magazine 103 mounted on the mounting section 101 enters through the body inlet section 105 into the body 104, subjected automatically to developing processings through the developing tank 106, the bleach-fixing tank 107, the first rinsing tank 108 and the second rinsing tank 109, and then dried in the drying section 110 and taken out through the body outlet 111, followed optionally by other steps such as cutting and others at the sections above the body 104, to give a product print. 112, 113 and 114 designate replenisher tanks for the developer tank 106, the bleach-fixing tank 107 and the first rinsing tank 108, respectively. These replenisher tanks are constituted in such a manner as illustrated in FIGS. 1 to 4.

The water supplying tank 115 (which can be omitted) containing water for diluting or dissolving processing agents stored therein is formed into a kit, and further the waste solution tank (not shown, positioned below the respective tanks 106–109 and the replenisher tanks 112–114) and/or the preliminary tanks 116, 117 (which can be omitted) are also detachably housed in the machine. In the FIGS., 118, 119 and 120 show replenishing agent kits, and 121 shows a shelf for placing said kits 118, 119 and 120 which also functions as the opening-closing lid.

The replenisher tank used in the present invention is applicable not only for replenisher tanks, but also for processing tanks. That is, the jetting section of the present invention may be provided at the portion for leading out the processing solution of the circulating and stirring means in the processing tank.

The present invention, having such a construction as described above, can accomplish the above-mentioned object, and exhibit excellent effects. Further, the automatic processing machine according to the present invention requires no utility supplying means such as water pipe etc. and discharging pipe means for waste solution.

We claim:

1. In an automatic processing machine for photography which automatically performs developing processing of a photographic light-sensitive material, comprising a processing solution tank; a replenisher tank for receiving and containing a replenisher solution: and means for supplying replenisher solution from said replenisher tank to said processing solution tank to replenish processing solution in said processing solution tank;

the improvement wherein said replenisher tank comprises means for circulating and stirring the replenisher solution in said replenisher tank, said circulating and stirring means including a jetting section for jetting a processing solution into said replenisher tand at least in the vicinity of the solution surface in said replenisher tank, said jetting section having jetting orifices at least in said vicinity of said solution surface in said replenisher tank.

2. An automatic processing machine according to claim 1, wherein said circulating and stirring means includes means for jetting processing solution brought from the bottom of said replenisher tank to the vicinity of the solution surface in said replenisher tank.

3. An automatic processing machine according to claim 2, wherein said means for jetting processing solution brought from said bottom of said replenisher tank includes a pipe coupled to an opening at the bottom of said replenisher tank for conveying said replenisher solution from the bottom of said replenisher tank to said jetting section.

4. An automatic processing machine according to claim 2, wherein said supplying means comprises a pipe communicating said replenisher tank to said processing solution tank.

5. An automatic processing machine according to claim 4, wherein said supplying means further comprises a pump coupled to said pipe for pumping said replenisher solution through said pipe.

6. An automatic processing machine according to claim 1, wherein said replenisher tank has a capacity of 25 liters or less.

7. An automatic processing machine according to claim 1, wherein said jetting section comprises a jetting member having outer walls arranged in the vicinity of the solution surface in said replenisher tank, said outer walls having a plurality of said jetting orifices therein, said jetting orifices being located in the vicinity of said solution surface in said replenisher tank.

8. An automatic processing machine according to claim 7, wherein said jetting member comprises a plurality of said orifices above the solution surface in said replenisher tank, and a further plurality of orifices arranged below said solution surface in said replenisher tank.

9. An automatic processing machine according to claim 1, wherein said jetting section comprises a pipe member extending substantially vertically in said replenisher tank and having a plurality said of orifices therein in the vicinity of said solution surface in said replenisher tank.

10. An automatic processing machine according to claim 9, wherein said plurality of said orifices comprises a first plurality of jetting orifices located above the solution surface in said replenisher tank, and a second plurality of jetting orifices located below said solution surface in said replenisher tank.

11. An automatic processing machine according to claim 10, wherein said orifices located below said solution surface comprise a plurality of orifices located adjacent said solution surface, and a further plurality of said orifices located substantially below the solution surface in said replenisher tank.

12. An automatic processing machine according to claim 11, wherein said pipe has a closed lower end portion.

13. An automatic processing machine according to claim 11, wherein said pipe has a open lower end portion.

14. In an automatic processing machine for performing a developing processing of a photographic light-sensitive material, comprising a replenisher tank for receiving and containing a replenisher solution; a processing solution tank coupled to said replenisher tank; and means for automatically supplying replenisher solution from said replenisher tank to said processing solution tank to replenish processing solution in said processing solution tank;

the improvement comprising:

a holding member mounted to said replenisher tank above the level of the solution therein, said holding member comprising an inclined mouth having a receiving area sufficiently large to receive at least a major portion of a vessel containing a procesing agent, said mouth being inclined relative to the surface of the solution in said replenisher tank and holding said vessel in an inclined state above the solution level of said replenisher tank for pouring of the contents of said vessel into said replenisher tank; and means supporting said holding member relative to said replenisher tank and covering substantially the complete upper opening portion of said replenisher tank.

15. The automatic processing machine of claim 14, wherein said vessel has a mouth located at the lower end thereof when it is in said inclined state, and wherein said holding member comprises an inclined lower surface means in the vicinity of said mouth of said vessel for directing the contents of said vessel into said replenisher tank.

16. The automatic processing machine of claim 15, wherein said inclined lower surface means has an opening below said mouth of said vessel, said opening being at the mouth of said vessel, said opening being at the lowest area of said inclined lower surface means.

17. The automatic processing machine of claim 14 wherein at least of said supporting means and holding member comprises a lip member extending inwardly of said replenisher tank.

18. The automatic processing machine of claim 14, wherein said holding member is removably mounted to said supporting means.

19. The automatic processing machine of claim 14, wherein said vessel receiving loading mouth is generally cylindrical.

* * * * *